(12) United States Patent
Gong et al.

(10) Patent No.: US 11,102,581 B2
(45) Date of Patent: Aug. 24, 2021

(54) BLUETOOTH EARPHONE CONNECTING METHOD, ELECTRONIC DEVICE AND STORAGE MEDIUM

(71) Applicant: GUANGDONG OPPO MOBILE TELECOMMUNICATIONS CORP., LTD., Guangdong (CN)

(72) Inventors: Jinhua Gong, Guangdong (CN); Jian Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 90 days.

(21) Appl. No.: 16/586,333

(22) Filed: Sep. 27, 2019

(65) Prior Publication Data

US 2020/0107127 A1    Apr. 2, 2020

(30) Foreign Application Priority Data

Sep. 30, 2018 (CN) .......................... 201811161238.7

(51) Int. Cl.
*H04R 5/04* (2006.01)
*H04W 76/15* (2018.01)
(Continued)

(52) U.S. Cl.
CPC .............. *H04R 5/04* (2013.01); *H04R 5/033* (2013.01); *H04W 4/80* (2018.02); *H04W 76/15* (2018.02); *H04R 2420/07* (2013.01)

(58) Field of Classification Search
CPC ...... H04R 5/04; H04R 5/033; H04R 2420/07; H04W 76/15; H04W 4/80
See application file for complete search history.

(56) References Cited

U.S. PATENT DOCUMENTS

| 2015/0124976 A1* | 5/2015 | Pedersen ............ A61N 1/37252 381/23.1 |
| 2016/0249140 A1 | 8/2016 | Nikles et al. |
| 2017/0325016 A1 | 11/2017 | Lee et al. |

FOREIGN PATENT DOCUMENTS

| CN | 101627613 | 1/2010 |
| CN | 103391118 | 11/2013 |

(Continued)

OTHER PUBLICATIONS

EPO, Office Action for EP Application No. 19200334.1, dated Jan. 2, 2020.

(Continued)

*Primary Examiner* — David L Ton
(74) *Attorney, Agent, or Firm* — Hodgson Russ LLP

(57) ABSTRACT

The embodiments of the present disclosure provide a Bluetooth earphone connecting method, a storage medium and an electronic device. The method includes obtaining two signal strengths between the electronic device and two Bluetooth earphones when the electronic device simultaneously connecting with the two Bluetooth earphones via Bluetooth; determining one of the two Bluetooth earphones as a first earphone and the other Bluetooth earphone as a second earphone when one of the two signal strengths is less than or equal to a preset strength, the second earphone corresponding to the signal strength which is less than or equal to the preset strength, and the first earphone corresponding to the other signal strength which is greater than the preset strength; and keeping the connection between the electronic device and the first earphone, and controlling the first earphone and the second earphone connecting with each other via Bluetooth.

20 Claims, 4 Drawing Sheets

(51) Int. Cl.
H04W 4/80 (2018.01)
H04R 5/033 (2006.01)

(56) References Cited

FOREIGN PATENT DOCUMENTS

| | | |
|---|---|---|
| CN | 103825635 | 4/2016 |
| CN | 105872654 | 8/2016 |
| CN | 106101991 | 11/2016 |
| CN | 107071618 | 8/2017 |
| CN | 107145330 | 9/2017 |
| CN | 107885478 | 4/2018 |
| CN | 108429949 | 8/2018 |
| CN | 109347581 | 2/2019 |
| EP | 2871857 | 5/2015 |
| EP | 2928212 | 5/2016 |

OTHER PUBLICATIONS

SIPO, First Office Action for CN Application No. 201811161238.7, dated Dec. 25, 2019.
WIPO, English translation of ISR and WO for PCT/CN2019/108184, Jan. 2, 2020.
SIPO, Second Office Action for CN Application No. 201811161238.7, dated May 15, 2020.
IPI, Office Action for in Application No. 201914039325, dated Dec. 17, 2020.

* cited by examiner

BLUETOOTH EARPHONE CONNECTING METHOD, ELECTRONIC DEVICE AND STORAGE MEDIUM

CROSS-REFERENCE TO RELATED APPLICATION

This application claims priority to a Chinese Patent Application No. 201811161238.7, filed on Sep. 30, 2018, the entire disclosure of which is incorporated herein by reference.

TECHNICAL FIELD

The present disclosure relates to a field of electronic device, and particularly to a Bluetooth earphone connecting method, an electronic device, and a storage medium.

BACKGROUND

With the development of electronic device technology and wireless connection technology, the technology of Bluetooth earphone is improved and widely used. Wherein, the Bluetooth earphone connects to the electronic device through Bluetooth, and can receive the audio data transmitted by the electronic device for audio playback. The data transmission between the earphone and the electronic device no longer depends on the wired connection, which makes the earphone more convenient to use. However, Bluetooth connection is a short-distance connection, which can only realize short-distance data exchange between the electronic device and the earphone, and the distance of data transmission is limited.

SUMMARY

In view of the above problems, the present disclosure provides a Bluetooth earphone connecting method, an electronic device and a storage medium to improve the above problems.

In a first aspect, the embodiment of the present disclosure provides a Bluetooth earphone connecting method, the method is applied to an electronic device. The method includes the operation of obtaining two signal strengths between the electronic device and two Bluetooth earphones when the electronic device simultaneously connecting with the two Bluetooth earphones via Bluetooth; determining one of the two Bluetooth earphones as a first earphone and the other Bluetooth earphone as a second earphone when one of the two signal strengths is less than or equal to a preset strength, the second earphone corresponding to the signal strength which is less than or equal to the preset strength, and the first earphone corresponding to the other signal strength which is greater than the preset strength; and keeping the connection between the electronic device and the first earphone, and controlling the first earphone and the second earphone connecting with each other via Bluetooth.

In a second aspect, the embodiment of the present disclosure provides an electronic device. The electronic device can include one or more processors; a memory; and one or more computer programs. The one or more computer programs are stored in the memory and configured to be executed by the one or more processors, and the one or more computer programs are configured to execute a Bluetooth earphone connecting method. The method comprises obtaining two signal strengths between the electronic device and two Bluetooth earphones when the electronic device simultaneously connecting with the two Bluetooth earphones via Bluetooth; determining one of the two Bluetooth earphones as a first earphone and the other Bluetooth earphone as a second earphone when one of the two signal strengths is less than or equal to a preset strength, the second earphone corresponding to the signal strength which is less than or equal to the preset strength, and the first earphone corresponding to the other signal strength which is greater than the preset strength; and keeping the connection between the electronic device and the first earphone, and controlling the first earphone and the second earphone connecting with each other via Bluetooth.

In a third aspect, the embodiment of the present disclosure provides a computer readable storage medium. The computer readable storage medium stores program codes, the program codes being executable by a processor to execute a Bluetooth earphone connecting method. The method comprises obtaining two signal strengths between the electronic device and two Bluetooth earphones when the electronic device simultaneously connecting with the two Bluetooth earphones via Bluetooth; determining one of the two Bluetooth earphones as a first earphone and the other Bluetooth earphone as a second earphone when one of the two signal strengths is less than or equal to a preset strength, the second earphone corresponding to the signal strength which is less than or equal to the preset strength, and the first earphone corresponding to the other signal strength which is greater than the preset strength; and keeping the connection between the electronic device and the first earphone, and controlling the first earphone and the second earphone connecting with each other via Bluetooth.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings can also be obtained from these drawings without any creative effort.

DETAILED DESCRIPTION

In order to better understand the disclosure for those skilled in the art, the technical solutions in the embodiments of the present disclosure are clearly and completely described in the following with reference to the accompanying drawings in the embodiments of the present disclosure.

With the increase of the types and the improvement of the sound effect for audio play device, more users will choose to output the audio played by electronic devices such as mobile phones and tablet computers to the audio playback device. Wherein, the audio play devices include car music players, speakers and earphone and so on. Among them, the earphones include wired earphones or wireless earphones.

Taking the earphone as an example, if the earphone is wired earphone, the wired earphone and the electronic device are connected by the physical line, and the electronic device transmits the audio to the wired earphone through the physical line, so that the wired earphone can play the audio.

In order to liberate the use of the earphone from the wired situation, make the connection between the earphone and the electronic device not depend on the physical line and increasing the convenience of the use of the earphone, the wireless earphone comes into being. The wireless earphone establishes a communication link in advance according to the wireless communication protocol supported by the electronic device, and then the electronic device transmits audio to the wireless earphone through the communication link, so that the wireless earphone can play audio. The wireless communication protocol can include WLAN protocol, Bluetooth protocol, ZigBee protocol, or some private protocols, commands, and the like.

In the embodiment of the present disclosure, an earphone which can establish a Bluetooth connection with other devices such as electronic devices through a Bluetooth protocol, a private protocol, or a command, and perform data transmission is defined as a Bluetooth earphone, such as a TWS (True Wireless Stereo) earphone, a TWS Plus earphone, and so on. The embodiments of the present disclosure mainly use Bluetooth earphones as examples for description.

Figure 1:
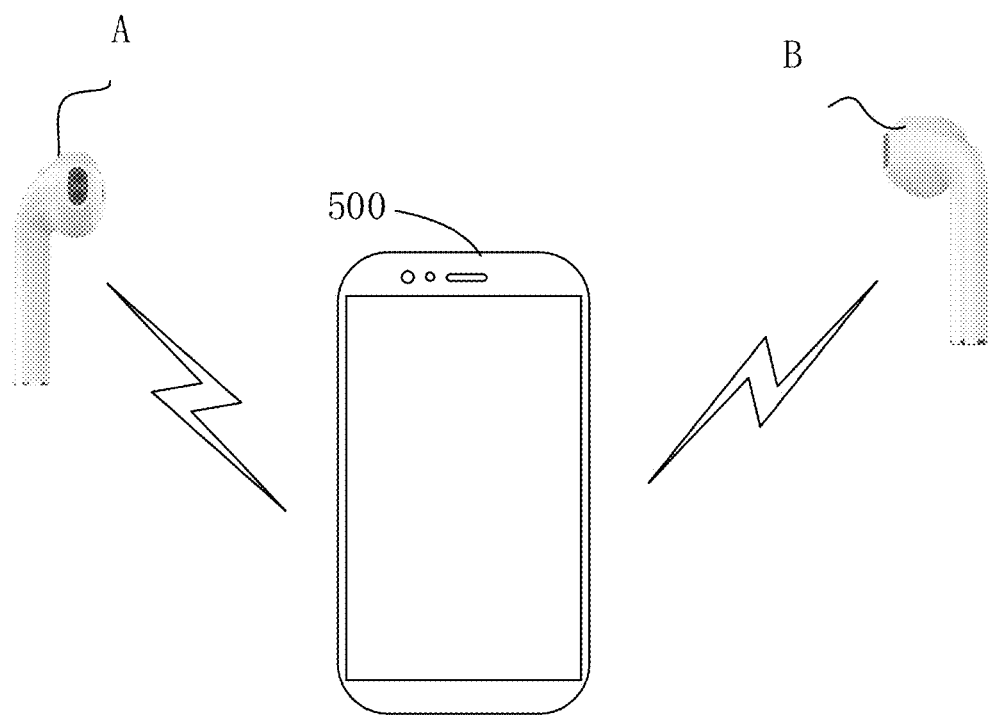
FIG. 1 is a schematic view of a connection between an electronic device and two Bluetooth earphones according to embodiments of the present disclosure.
Figure 2:
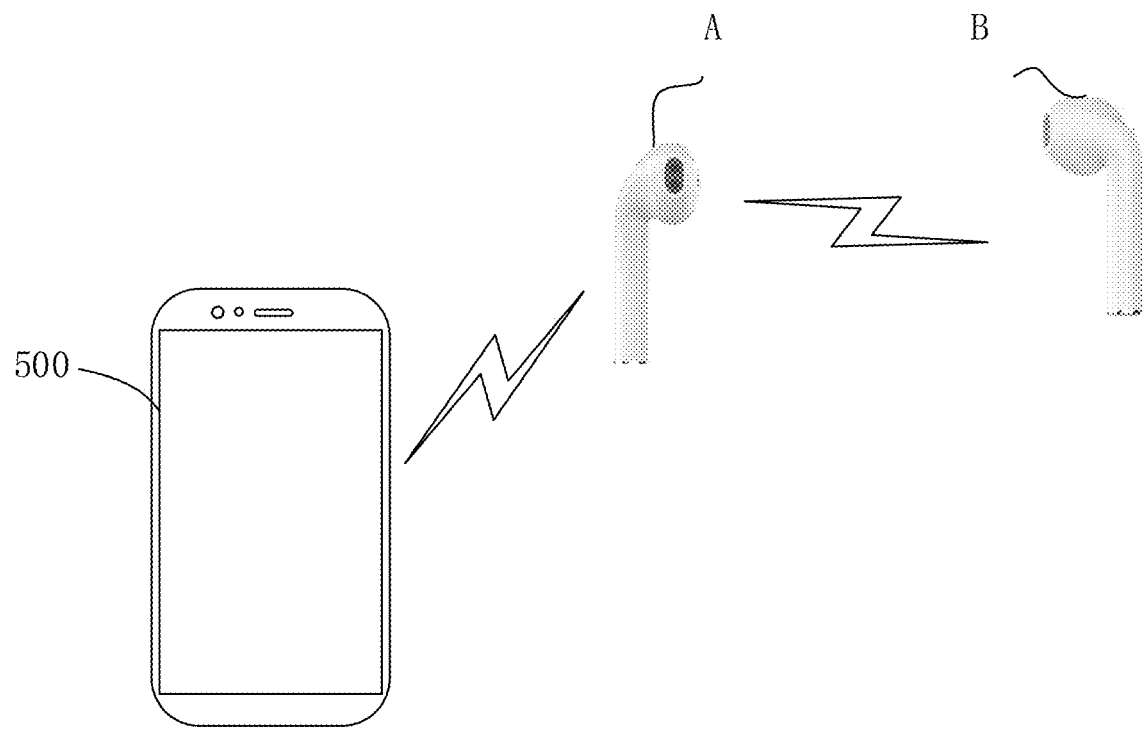
FIG. 2 is another schematic view of a connection between an electronic device and two Bluetooth earphones according to embodiments of the present disclosure.

In the embodiments of the present disclosure, an electronic device can send data to two Bluetooth earphones in parallel connection or in series connection. In parallel connection, as shown in FIG. 1, the electronic device 500 directly connects with the Bluetooth earphone A and the Bluetooth earphone B simultaneously according to the Bluetooth protocol. In the series connection, as shown in FIG. 2, the electronic device 500 connects with the Bluetooth earphone A, and the Bluetooth earphone A which has been connected with the electronic device connects with the Bluetooth earphone B.

If the electronic device connects two Bluetooth earphones in parallel, the data will be transmitted directly to two Bluetooth earphones separately. Compared with the series connection, the path of data transmission in parallel is shorter, and the speed is faster and the time required is less. However, when the electronic device is connected with two Bluetooth earphones in parallel, the distance between any one of the two Bluetooth earphones and the electronic device is limited, and any Bluetooth earphone must be covered by the Bluetooth signal of the electronic device. For example, two Bluetooth earphones are respectively worn by different users, when any user has a large range of activities relative to the electronic device, the Bluetooth signal may be weak or even disconnection between the Bluetooth earphone worn by the user and the electronic device. In the situation, the data transmission is slower and takes longer time, which affects the experience of the user.

In order to balance the data transmission speed and the data transmission distance between the electronic device and the Bluetooth earphone, the embodiments of the present disclosure proposes a Bluetooth earphone connecting method, an electronic device and a storage medium of the embodiments of the present disclosure. The electronic device and the two Bluetooth earphones are connected simultaneously in parallel, and the signal strength between the electronic device and each Bluetooth airphone of the two Bluetooth earphones is obtained. When the signal strength of the Bluetooth earphone B is too weak due to the user's activity being too far away from the electronic device, the distance between the Bluetooth earphone A and the Bluetooth earphone B may be closer. The signal strength between the Bluetooth earphone A and the Bluetooth earphone B may be stronger than the signal strength between the Bluetooth earphone B and the electronic device. Therefore, the Bluetooth earphone B is ordered to establish a Bluetooth connection with the Bluetooth earphone A to extend the range that the Bluetooth can cover.

The Bluetooth earphone connecting method, electronic device and storage medium provided by the embodiments of the present disclosure will be described in detail through specific embodiments below.

Figure 3:
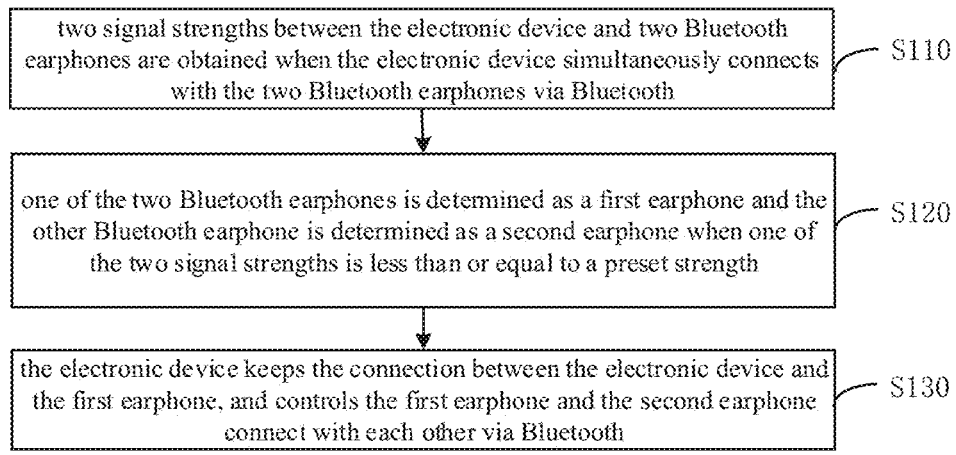
FIG. 3 is a schematic flowchart view of a Bluetooth earphone connecting method according to an embodiment of the present disclosure.

Referring to FIG. 3, the embodiment of the present disclosure provides a Bluetooth earphone connecting method, in which a Bluetooth earphone connection is adjusted according to the signal strength. Specifically, the method includes the followings.

Operation S110: two signal strengths between the electronic device and two Bluetooth earphones are obtained when the electronic device simultaneously connects with the two Bluetooth earphones via Bluetooth.

When the electronic device is connected with the two Bluetooth earphone in parallel as shown in FIG. 1, the signal strength between the electronic device and each of the two Bluetooth earphone is obtained. That is, the electronic device obtains the signal strength with the Bluetooth earphone A, and the electronic device obtains the signal strength with the Bluetooth earphone B. Among them, the electronic device can obtain the signal strengths with the two Bluetooth earphone in real time, and can also obtain them according to a preset period.

The representation of the signal strength in the electronic device is not limited, such as nw (milliwatts), dBm (db-milliwatts), RSSI (Received Signal Strength Indicator), and percentage.

The embodiment of the present disclosure is described with RSSI as an example. The RSSI is usually a negative value. The maximum value of RSSI is 0 dBm, which indicates the best signal under ideal state. A larger RSSI value indicates a better signal.

The electronic device can obtain the signal strength RSSI by broadcasting. For example, a registration scanning broadcast is added in the oncreate method. A new broadcast-receiver broadcast object is established, and the onreceive method is implemented, in which the RSSI can be obtained.

Operation S120: one of the two Bluetooth earphones is determined as a first earphone and the other Bluetooth earphone is determined as a second earphone when one of the two signal strengths is less than or equal to a preset strength. The second earphone corresponding to the signal strength which is less than or equal to the preset strength, and the first earphone corresponding to the other signal strength which is greater than the preset strength.

The electronic device compares the two signal strengths with the preset strength, and determines each one of the two signal strengths whether greater than the preset strength or less than the preset strength. The determination can be performed in a preset period or in real time, or each time when the signal strength is obtained by the electronic device. It can be understood that the two signal strengths are the signal strengths between the electronic device and the two Bluetooth earphones respectively. If the electronic device is connected to the Bluetooth earphone A and the Bluetooth earphone B, the two signal strengths include the signal strength between the electronic device and the Bluetooth earphone A and the signal strength between the electronic device and the Bluetooth earphone B.

The preset strength is a signal strength indicating that the signal strength is weak. When the signal strength is less than or equal to the preset strength, the transmission speed and transmission stability of the data sent by the electronic device to the Bluetooth earphone are lower.

The preset strength is represented by a value. In the embodiments of the disclosure, the specific value of the preset strength is not limited. For example, the signal strength is represented by RSSI, when the RSSI value of the Bluetooth signal strength is less than −70 dBm, it generally indicates that the Bluetooth signal strength is weak. Therefore, the value of the preset strength can be configured to −70 dBm.

In the case where the signal strength is expressed by other means, if the value of a signal strength is larger, it indicates that the signal strength is stronger, when a signal whose signal strength is less than or equal to the preset strength, the value of the signal strength of the signal is less than or equal to the value of the preset strength. If the value of a signal strength is larger, it indicates that the signal strength is weaker, when a signal whose signal strength is less than or equal to the preset strength, the value of the signal strength of the signal is greater than or equal to the value of the preset strength.

If the two signal strengths obtained by the electronic device are both greater than the preset strength, the electronic device and the two Bluetooth earphones remain in parallel connection. That is, the electronic device can keep the connection between the electronic device and the first earphone and keep the connection between the electronic device and the second earphone, when the two signal strengths between the electronic device and the two Bluetooth earphones are both greater than the preset strength.

If one of the two signal strengths obtained by the electronic device is less than or equal to the preset strength, it indicates that the signal strength is too weak, which will affect the data transmission between the electronic device and the Bluetooth earphone. Therefore, it is necessary to adjust the connection between the electronic device and the Bluetooth earphone.

Specifically, the Bluetooth earphone corresponding to the signal strength greater than the preset strength is determined as the first earphone by the electronic device, and the Bluetooth earphone corresponding to the signal strength less than or equal to the preset strength is determined as the second earphone. For example, if the signal strength between the electronic device and Bluetooth earphone A is greater than the preset strength, and the signal strength between the electronic device and Bluetooth earphone B is less than or equal to the preset strength, the electronic device determines the Bluetooth earphone A as the first earphone and determines the Bluetooth earphone B as the second earphone.

Operation S130: the electronic device keeps the connection between the electronic device and the first earphone, and controls the first earphone and the second earphone connect with each other via Bluetooth.

The electronic device still maintains a Bluetooth connection with the first earphone, and controls the first earphone to connect with the second earphone. Thereby, the electronic device can transmit the data, which aims to be sent to the second earphone, to the first earphone. Then the data will be sent to the second earphone by the first earphone. Through the relay of the first earphone, a longer distance of data transmission to the second earphone can be realized and the coverage of the Bluetooth is expanded.

Optionally, as an embodiment, the way in which the electronic device controls the first earphone and the second earphone to connect with each other via Bluetooth can be sending a second instruction to the second earphone, where the second instruction is used to control the second earphone to establish a connection with the first Bluetooth earphone, that is, the second instruction is configured to control the second earphone to connect to the first Bluetooth earphone via Bluetooth.

Optionally, in the embodiment, when the electronic device determines that the second earphone receives the second instruction, the electronic device can disconnect the Bluetooth connection between the electronic device and the second earphone. When the electronic device receives a second confirmation message sent from the second earphone, the second confirmation message indicates that the second earphone has received the second instruction, the electronic device determines that the second earphone receives the second instruction.

Or, optionally, in the embodiment, the second instruction may include a Bluetooth disconnection instruction and a Bluetooth connection instruction for controlling the second earphone to disconnect with the electronic device and to establish a Bluetooth connection with the first earphone.

Optionally, as another embodiment, the electronic device can send a third instruction to the first earphone for controlling the Bluetooth connection between the first earphone and the second earphone. The third instruction is configured to control the first earphone to connect with the second earphone via Bluetooth, the first earphone that receives the third instruction is paired with the second earphone according the third instruction.

Optionally, in the embodiment, the electronic device can actively disconnect the Bluetooth connection with the second earphone after determining that the third instruction has been successfully transmitted to the first earphone, so that the second earphone is only connect to the first earphone Bluetooth.

Optionally, in the embodiment, the second earphone can also actively disconnect the Bluetooth connection with the electronic device and establish a Bluetooth connection with the first earphone, when the second earphone receives the pairing request of the first earphone.

In the embodiment of the present disclosure, the above two embodiments can be performed alternatively.

It is necessary for the second earphone to establish a Bluetooth connection with the first earphone due to the low signal strength of the second earphone. Alternatively, the electronic device can first implement the first embodiment above. The electronic sends a second instruction to the second earphone, then, the second earphone actively performs the Bluetooth disconnection with the electronic device and the Bluetooth connection with the first earphone. If the second earphone does not receive the second instruction due to the signal between second earphone and the electronic is too weak, the electronic device does not receive the second message from the second earphone within a preset time period, the electronic can sends the third instruction to the first earphone according to the second embodiment described above.

When the electronic device maintains a Bluetooth connection with the first earphone and the first earphone is connected to the second earphone via Bluetooth, the electronic device can send all the data, which is to be sent to the first earphone and the second earphone, to the first earphone via Bluetooth. The first earphone then sent the data which is to be sent to the second earphone to the second earphone.

In the embodiment of the present disclosure, when the Bluetooth signal strength between the second earphone and the electronic device is too weak, the first earphone can be used as the relay device. The electronic device connects with the first earphone via Bluetooth, and the first earphone connect with the second earphone via Bluetooth. Therefore, when the signal between the second earphone and the electronic device is too weak, data can be transmitted from the electronic device to the second earphone at a faster speed through relaying of the first earphone.

Figure 4:
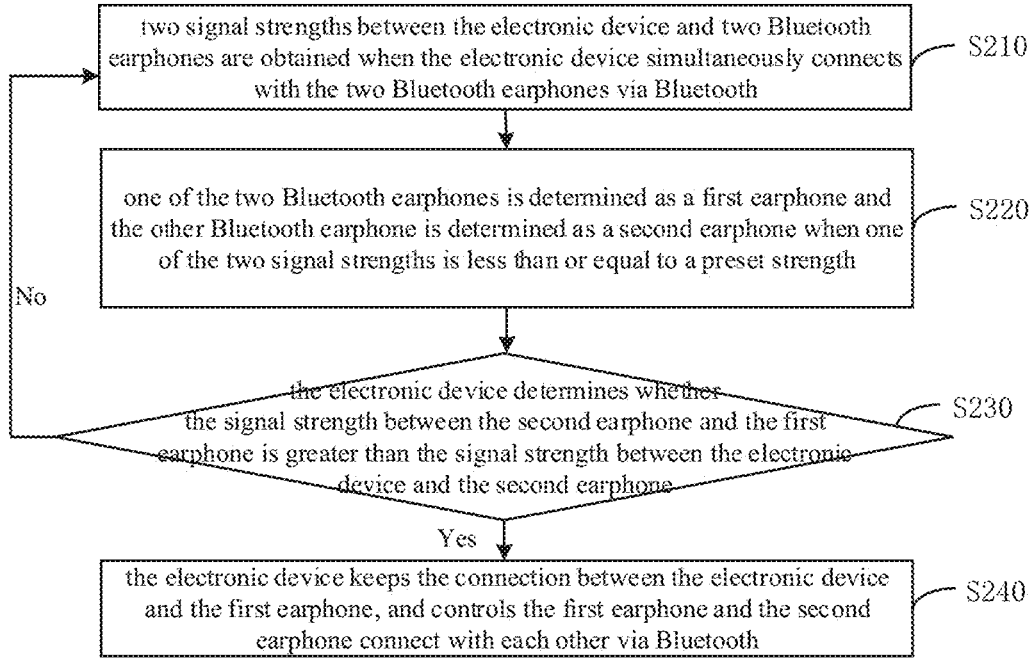
FIG. 4 is a schematic flowchart view of a Bluetooth earphone connecting method according to another embodiment of the present disclosure.

In the embodiment of the present disclosure, the signal strength between the second earphone and the electronic device is too weak, however, if the signal strength between the second earphone and the first earphone is weaker at the same time, the data transmission effect through the first earphone relay may be worse. Therefore, in the embodiment of the present disclosure, it is also possible to determine whether the first earphone relay is used according to the signal strength between the second earphone and the first earphone. Specifically, referring to FIG. 4, the method includes the followings.

Operation S210: two signal strengths between the electronic device and two Bluetooth earphones are obtained when the electronic device simultaneously connects with the two Bluetooth earphones via Bluetooth.

Operation S220: one of the two Bluetooth earphones is determined as a first earphone and the other Bluetooth earphone is determined as a second earphone when one of the two signal strengths is less than or equal to a preset strength. The second earphone corresponding to the signal strength which is less than or equal to the preset strength, and the first earphone corresponding to the other signal strength which is greater than the preset strength.

In the two signal strengths between the two Bluetooth earphones and the electronic device, when one signal strength is less than the preset strength, and the other is greater than the preset strength, the first earphone and the second earphone are determined according to the magnitude relationship between the signal strength and the preset strength.

Optionally, in the embodiment of the present disclosure, The electronic device determines one of the two Bluetooth earphones as the first earphone and the other Bluetooth earphone as the second earphone when the two signal strengths between the electronic device and the two Bluetooth earphones are less than the preset strength, the second earphone corresponding to the signal strength which is less than the other signal strength. So that, the Bluetooth earphone with a weaker signal is relayed through the Bluetooth earphone with a stronger signal.

Optionally, in the embodiment of the present disclosure, when the signal strengths between the electronic device and the two Bluetooth earphones are both less than a preset strength, signals between the two Bluetooth earphone and the electronic device are too weak, and the electronic device can also maintain a simultaneous connection with two Bluetooth earphone in parallel. That is, the electronic device can keep the connection between the electronic device and the first earphone and keep the connection between the electronic device and the second earphone, when the two signal strengths between the electronic device and two Bluetooth earphones are both less than the preset strength.

Optionally, in the embodiment of the present disclosure, if one of the two Bluetooth earphones is disconnected due to a weak signal or other reasons, and the disconnection is not actively disconnected. That is, the disconnection is not under the control of a control instruction. It indicates that the disconnected Bluetooth earphone needs the relay of the connected Bluetooth earphone. Therefore, the electronic device can determine one of the two Bluetooth earphones as the first earphone and the other Bluetooth earphone as the second earphone when one of the two Bluetooth earphones is disconnected with the electronic device, the electronic device can keep the connection with the first earphone and disconnect with the second earphone. That is to say, among the Bluetooth earphone A and the Bluetooth earphone B, if the connection between the Bluetooth earphone A and the electronic device is maintained, and the Bluetooth connection between the Bluetooth earphone B and the electronic devices is disconnected, the Bluetooth earphone A is used as the first earphone, and the Bluetooth earphone B is used as the second earphone.

Operation S230: the electronic device determines whether the signal strength between the second earphone and the first earphone is greater than the signal strength between the electronic device and the second earphone. When the signal strength between the second earphone and the first earphone is greater than the signal strength between the electronic device and the second earphone, the electronic device performs the operation S240; when the signal strength between the second earphone and the first earphone is less than or equal to the signal strength between the electronic device and the second earphone, the electronic device performs the operation 210.

In order to obtain a good data transmission effect and ensure that the signal between the first earphone and the second earphone is stronger than the signal between the second earphone and the electronic device, the electronic device can determine whether the signal strength between the second earphone and the first earphone is greater than the signal strength between the electronic device and the second earphone.

Specifically, the electronic device can first obtain the signal strength between the second earphone and the first earphone, and how to obtain the signal strength between the second earphone and the first earphone is not limited in the embodiment of the present disclosure. For example, the electronic device sends a first instruction to the first earphone, the first earphone obtains the signal strength between the first earphone and the second earphone according to the first instruction. The first instruction is configured to control the first earphone to obtain the signal strength between the first earphone and the second earphone.

There are usually two methods to get the signal strength of Bluetooth (such as RSSI). One is based on scanning, which scans the surrounding Bluetooth signals and obtains the signal strength; the other is based on the connection, that is, two Bluetooth devices establish a Bluetooth connection and any one of the two Bluetooth can measure the RSSI. The specific way of the first earphone obtains the signal strength between the first earphone and the second earphone is not limited in the embodiment of the present disclosure, and the following is some examples.

For example, the way in which the first earphone obtains the signal strength between the first earphone and the second earphone may be that the first earphone feeds back a first confirmation message to the electric device when the first earphone receives the first instruction. The first confirmation message indicates that the first earphone has received the first instruction.

As an embodiment, if there is only one Bluetooth module in the second earphone, the electronic device may disconnect the Bluetooth connection with the second earphone when it receives the first confirmation message because the Bluetooth signal in connection may not be detected by scanning. The first earphone starts to scan the Bluetooth signal of the second earphone when it feeds back the first confirmation message to the electronic device. The first earphone can obtain the Bluetooth signal strength of the scanned second earphone, and returns the signal strength to the electronic device.

As another embodiment, if the second earphone includes two Bluetooth modules, the two Bluetooth modules are used to connect the first earphone and the electronic device respectively. When the first earphone receives the first instruction, the first earphone can scan the signal of the Bluetooth module in the second earphone for connecting the first earphone, obtain the signal strength of the signal and return the signal strength to the electronic device.

As another embodiment, when the electronic device receives the first confirmation message sent from the first earphone, the electronic device disconnects the Bluetooth connection with the second earphone. The first earphone is connected to the second earphone via Bluetooth when the first earphone feeds back the first confirmation message to the electronic device. After the first earphone is Bluetooth connected with the second earphone, the first earphone can obtain the Bluetooth signal strength between the first earphone and the second earphone, and return the signal strength to the electronic device.

The electronic device receives the signal strength between the second earphone and the first earphone sent from the first earphone, and compares it with the signal strength between the electronic device and the second earphone. If the signal strength between the second earphone and the first earphone is less than or equal to the signal strength between the electronic device and the second earphone, the electronic device still connects with the first earphone and the second earphone in parallel. If the connection between the electronic device and the second earphone is disconnected at this time, the electronic device can establish a connection with the second earphone.

If the signal strength between the second earphone and the first earphone is greater than the signal strength between the electronic device and the second earphone, the operation S240 is performed.

Operation S240: the electronic device keeps the connection between the electronic device and the first earphone, and controls the first earphone and the second earphone connect with each other via Bluetooth.

Optionally, in the embodiment of the present disclosure, the operation S230 may be performed before the operation S240, or may be performed after the operation S240. That is, after the first earphone and the second earphone is determined by the electronic device, the electronic device can maintain the Bluetooth connection with the first earphone and control the first earphone and the second earphone to connect with each other via Bluetooth. Moreover, the electronic device obtains the signal strength between the first earphone and the second earphone, and compares it with the signal strength between the electronic device and the second earphone. If the signal strength between the second earphone and the first earphone is less than or equal to the signal strength between the electronic device and the second earphone, the electronic device still connects with the first earphone and the second earphone in parallel. That is, the electronic device can send a Bluetooth disconnection instruction to the first earphone, the Bluetooth disconnection instruction used to control the first earphone to disconnect the Bluetooth connection with the second earphone, and then the electronic device connects to the second earphone via Bluetooth.

If the signal strength between the second earphone and the first earphone is greater than the signal strength between the electronic device and the second earphone, the Bluetooth connection between the electronic device and the first earphone is maintained, and the first earphone is connected to the second earphone via Bluetooth.

In the embodiment of the present disclosure, only when the signal strength between the electronic device and the second earphone is less than or equal to the signal strength between the first earphone and the second earphone, the electronic device is connected to the second earphone via Bluetooth through the relay of the first earphone. The Bluetooth coverage distance of the electronic device is extended and a better data transmission method is obtained.

In the embodiments of the present disclosure, the same or similar operations as the foregoing embodiments can be referred to each other, and details are not described in the embodiments of the present disclosure.

Figure 5:
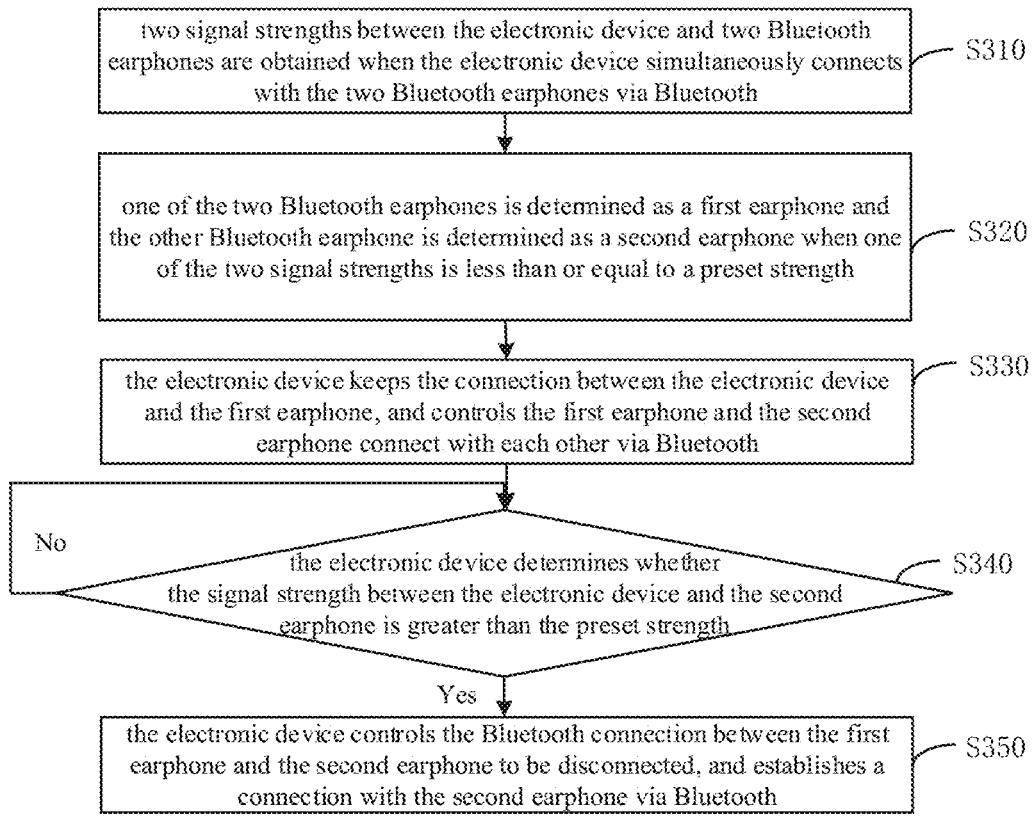
FIG. 5 is a schematic flowchart view of a Bluetooth earphone connecting method according to another embodiment of the present disclosure.

When the electronic device is connected in parallel with two Bluetooth earphones, the data transmission path is shorter, the transmission speed is faster and the time is shorter. Therefore, in the case where the second earphone is relayed through the first earphone, it can be monitored whether the signal strength between the second earphone and the electronic device becomes greater than a preset strength. Specifically, referring to FIG. 5, the method provided by the embodiment of the present disclosure can include the following operations.

Operation S310: two signal strengths between the electronic device and two Bluetooth earphones are obtained when the electronic device simultaneously connects with the two Bluetooth earphones via Bluetooth.

Operation S320: one of the two Bluetooth earphones is determined as a first earphone and the other Bluetooth earphone is determined as a second earphone when one of the two signal strengths is less than or equal to a preset strength. The second earphone corresponding to the signal strength which is less than or equal to the preset strength, and the first earphone corresponding to the other signal strength which is greater than the preset strength.

Operation S330: the electronic device keeps the connection between the electronic device and the first earphone, and controls the first earphone and the second earphone connect with each other via Bluetooth.

The operation S310 to operation S330 can refer to the embodiments described above and will not be described again.

Operation S340: the electronic device determines whether the signal strength between the electronic device and the second earphone is greater than the preset strength. When the signal strength between the electronic device and the second earphone is greater than the preset strength, the electronic device performs the operation S350; when the signal strength between the electronic device and the second earphone is not greater than the preset strength, the electronic device performs the operation S340.

When the electronic device is connected to the first earphone and the second earphone is connected to the first earphone, the electronic device determines whether the signal strength between the electronic device and the second earphone is greater than the preset strength. Wherein, the determination can be in real time or in a preset period.

Specifically, the electronic device can obtain the signal strength between the electronic device and the second earphone, such as RSSI of the signal between the electronic device and the second earphone. The electronic device then determines whether the signal strength between the electronic device and the second earphone is greater than the preset strength.

As an embodiment, in order to make the connection between the second earphone and the first earphone uninterrupted, the electronic device can obtain the signal strength between the electronic device and the second earphone by scanning. That is, the electronic device scans the Bluetooth signal of the second earphone and obtains its signal strength.

As another embodiment, before the electronic device sends a data, which needs to be sent to the second earphone, to the first earphone, the electronic device can send a Bluetooth disconnection instruction to the first earphone to controls the Bluetooth disconnection between the first earphone and the second earphone, and then the electronic device can connect to the second earphone. After the Bluetooth connection between the electronic device and the second earphone is established, the signal strength between the electronic device and the second earphone is obtained by the electronic device.

Operation S350: the electronic device controls the Bluetooth connection between the first earphone to disconnect, and establishing the connection between the electronic device and the second earphone via Bluetooth.

If the signal strength between the electronic device and the second earphone is greater than the preset strength, the electronic device can connect with the first earphone and the second earphone in parallel. At this time, if the second earphone is not connected to the electronic device but is connected to the first earphone, the electronic device can control the Bluetooth connection between the first earphone and the second earphone to disconnect, and establishes the Bluetooth connection with the second earphone. The way in which the electronic device controls the Bluetooth connection between the first earphone and the second earphone to disconnect is not limited. For example, the electronic device can send a Bluetooth disconnection instruction to the first earphone for controlling the first earphone to disconnect the Bluetooth disconnection with the second earphone. If the electronic device is connected to the second earphone for obtaining the signal strength between the electronic device and the second earphone, the Bluetooth connection of the electronic device and the second earphone is maintained.

If the signal strength between the electronic device and the second earphone is less than or equal to the preset strength, the second earphone obtains the data sent by the electronic device through the relay of the first earphone. In other words, the electronic device maintains the Bluetooth connection with the first earphone, and the first earphone is connected with the second earphone via Bluetooth.

Optionally, in some embodiments, when the signal strength between the electronic device and the second earphone is not greater than the preset strength, the electronic device may send the second instruction to the second earphone, the second instruction is used to indicate that the second earphone connects to the first earphone via Bluetooth after disconnecting from the electronic device. After the electronic device sends the second instruction to the second earphone, the electronic device disconnects the connection with the second earphone, so that the second earphone establishes a Bluetooth connection with the first earphone according to the second instruction, and continues to relay through the first earphone. The electronic device can disconnect the connection with the second earphone after receiving the second confirmation message returned by the second earphone.

Optionally, in some embodiments, when the signal strength between the electronic device and the second earphone is not greater than the preset strength, the electronic device may send the third instruction to the first earphone, the third instruction is used to indicate that the first earphone connects to the second earphone via Bluetooth. After the electronic device sends the third instruction to the first earphone, the electronic device disconnects the connection with the first earphone, so that the first earphone establishes a Bluetooth connection with the second earphone according to the third instruction, and continues to relay through the first earphone. The electronic device can disconnect the connection with the first earphone after receiving a third confirmation message returned by the first earphone. The third confirmation message indicates that the first earphone has received the third instruction.

At this time, if the second earphone is relayed through the first earphone, the relay is maintained. If the electronic device is connected to the second earphone for obtaining the signal strength between the electronic device and the second earphone, the electronic device disconnects the connection with the second earphone and controls the second earphone and the first earphone to connect with each other.

In the embodiment of the present disclosure, when the electronic device connects two Bluetooth earphones in a serial connection as shown in FIG. 2, the electronic device can determine whether the signal strength between the electronic device and the second earphone is greater than the preset strength. If the signal strength between the electronic device and the second earphone is greater than the preset strength, the Bluetooth connection is adjusted to the parallel connection shown in FIG. 1 to obtain a good data transmission.

Figure 6:
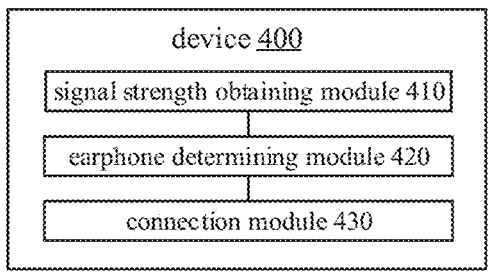
FIG. 6 is a functional block view of a Bluetooth earphone connecting device according to embodiments of the present disclosure.

The embodiment of the present disclosure also provides a Bluetooth earphone connecting device 400, the Bluetooth earphone connecting device 400 is applied to the electronic device. As shown in FIG. 6, the device 400 includes the following modules. A signal strength obtaining module 410 is configured to obtain two signal strengths between the electronic device and two Bluetooth earphones when the electronic device simultaneously connects with the two Bluetooth earphones via Bluetooth. An earphone determining module 420 is configured to determine one Bluetooth earphone corresponding to a signal strength greater than a preset strength as a first earphone and determine the other Bluetooth earphone corresponding to the signal strength less than or equal to the preset strength as a second earphone, when one of the two signal strengths is less than or equal to the preset strength A connection module 430 is configured to keep the connection between the electronic device and the first earphone, and control the first earphone and the second earphone connect with each other via Bluetooth.

Optionally, in the embodiment of the present disclosure, the method can also include a first determining module, the first determining module is configured to determine whether the signal strength between the second earphone and the first earphone is greater than the signal strength between the electronic device and the second earphone. when the signal strength between the second earphone and the first earphone is greater than the signal strength between the electronic device and the second earphone, the connection module 430 is configured to keep the connection between the electronic device and the first earphone, and control the first earphone and the second earphone connect with each other via Bluetooth.

Optionally, the earphone determining module 420 can also be configured to determine whether each of the two earphones is the first earphone or the second earphone, when the two signal strengths between the electronic device and the two Bluetooth earphones are both less than the preset strength. One Bluetooth earphone corresponding to the lower signal strength is determined as the second earphone, and the other Bluetooth earphone corresponding to the greater signal strength is determined as the first earphone.

Optionally, the earphone determining module 420 can further be configured to determine whether each of the two earphones is the first earphone or the second earphone, when one of the two Bluetooth earphones is disconnected with the electronic device. The Bluetooth earphone that maintains a Bluetooth connection with the electronic device is determined as the first earphone, and the Bluetooth earphone disconnects with the electronic device is determined as the second earphone.

Optionally, in the embodiment of the present disclosure, the method can also include a connection disconnecting module, which is configured to disconnect the Bluetooth connection between the electronic device and the second earphone.

Optionally, in the embodiment of the present disclosure, the connection module 430 can send a second instruction to the second earphone to control the second earphone to connect to the first Bluetooth earphone via Bluetooth.

Optionally, in the embodiment of the present disclosure, the Bluetooth earphone connecting device 400 can also include a second determining module, which is configured to determine whether the signal strength between the electronic device and the second earphone is greater than the preset strength. When the signal strength between the electronic device and the second earphone is greater than the preset strength, the connection module 430 is configured to control the Bluetooth connection between the first earphone and the second earphone to disconnect, and establish a Bluetooth connection between the electronic device and the second earphone.

Technicians in the field can clearly understand that for the convenience and simplicity of the description, the specific working process of the foregoing description of the device and the module can refer to the corresponding process in the embodiments of the above-mentioned method, which will not be described again here.

In several embodiments provided in this disclosure, the coupling between modules can be electrical, mechanical or other forms of coupling.

In addition, each functional module in each embodiment of the present disclosure can be integrated into one processing module, or each module can exist physically separately, or two or more modules can be integrated into one module. The above integrated modules can be implemented either in the form of hardware or in the form of software functional modules.

Figure 7:
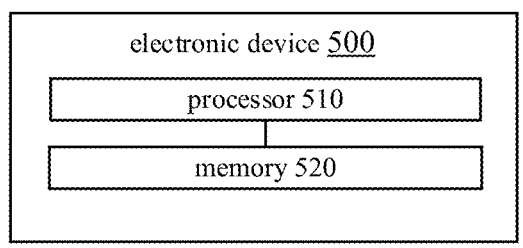
FIG. 7 is a schematic structural view of an electronic device according to embodiments of the present disclosure.

Referring to FIG. 7, a schematic structural view of an electronic device 500 provided in the embodiments of the present disclosure is illustrated. The electronic device 500 can be an electronic device capable of running an application, such as a smart phone, a tablet computer, or a music playing device. The electronic device includes one or more processors 510 (only one is shown in the figure), a memory 520 and one or more computer programs. The one or more computer programs are stored in the memory 520 and configured to be executed by the one or more processors 510. The one or more computer programs are configured to execute the method of any one of the above embodiments.

Each processor 510 can include one or more processing cores. Each processor 510 connects various parts of the entire electronic device 500 using various interfaces and lines. It performs various functions and processes data of the electronic device 500 by running or executing instructions, programs, code sets or instruction sets stored in memory 520 and calling data stored in memory 520. Optionally, the processor 510 can be implemented in at least one hardware form such as digital signal processing (DSP), a field-programmable gate array (FPGA), and a programmable logic array (PLA). The processor 510 can integrate one or more combinations of a central processing unit (CPU), a graphics processing unit (GPU), a modem, and the like. The CPU mainly deals with the operating system, user interface and disclosures; the GPU is responsible for rendering and drawing of the display content; the modem is used to process wireless communication. It can be understood that the above modem may not be integrated into the processor 510 and can be implemented separately by a communication chip.

The memory 520 can include a random access memory (RAM), or a read-only memory. The memory 520 can be used to store instructions, programs, code, code sets or instructions sets. The memory 520 can include a storage program area and a storage data area, wherein the storage program area can store instructions for implementing an operating system, instructions for implementing at least one function, instructions for implementing the various method embodiments described above, and the like. The storage data area can also store the data (such as a phone book, audio and video data, and chat record data) created by the electronic device in use.

Figure 8:
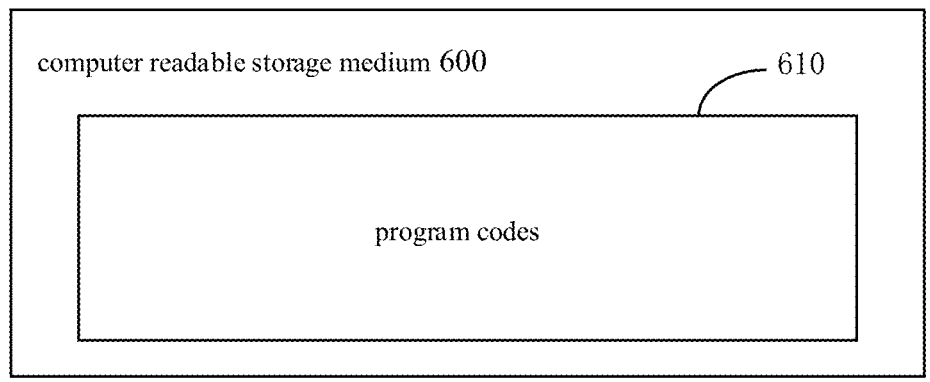
FIG. 8 is a storage unit for saving or carrying program codes for implementing a Bluetooth earphone connecting method according to embodiments of the present disclosure.

Referring to FIG. 8, a schematic view of a computer readable storage medium provided by in the embodiment of the present disclosure is illustrated. Program code is stored in the computer readable storage medium 600, and the program code can be executable by a processor to execute the method of the embodiments described above.

The computer readable storage medium 600 can be an electronic memory such as a flash memory, an EEPROM (Electrically Erasable Programmable Read Only Memory), an EPROM, a hard disk, or a ROM. Alternatively, the computer readable storage medium 600 may be a non-transitory computer-readable storage medium. The computer readable storage medium 600 has a storage space for program code 610 that performs any of the method operations described above. The program code can be read from or written to one or more computer program products. Program code 610 can be compressed, for example, in a suitable form.

It should be noted that the above embodiments are only used to explain the technical solutions of the present disclosure, not to limit it. Although the present disclosure is described in detail with reference to the foregoing embodiments, it should be understood by those skilled in the art that they can still modify the technical solutions described in the foregoing embodiments, or the equivalently replace some of the technical features. These modifications and substitutions do not drive the essence of the corresponding technical solutions away from the spirit and scope of the technical solutions of the embodiments of the present disclosure.

What is claimed is:

1. A Bluetooth earphone connecting method, applied to an electronic device, comprising:
   obtaining two signal strengths between the electronic device and two Bluetooth earphones when the electronic device simultaneously connecting with the two Bluetooth earphones via Bluetooth;
   determining one of the two Bluetooth earphones as a first earphone and the other Bluetooth earphone as a second earphone when one of the two signal strengths is less than or equal to a preset strength, the second earphone corresponding to the signal strength which is less than or equal to the preset strength, and the first earphone corresponding to the other signal strength which is greater than the preset strength;
   determining whether the signal strength between the second earphone and the first earphone is greater than the signal strength between the electronic device and the second earphone; and
   keeping the connection between the electronic device and the first earphone, and controlling the first earphone and the second earphone connecting with each other via Bluetooth, when the signal strength between the second earphone and the first earphone is greater than the signal strength between the electronic device and the second earphone.

2. The method of claim 1, prior to the operation of determining whether the signal strength between the second earphone and the first earphone is greater than the signal strength between the electronic device and the second earphone, further comprising:
   obtaining the signal strength between the second earphone and the first earphone.

3. The method of claim 2, the operation of obtaining the signal strength between the second earphone and the first earphone comprising:
   sending a first instruction to the first earphone from the electronic device, wherein the first instruction is configured to control the first earphone to obtain the signal strength between the first earphone and the second earphone;
   disconnecting the Bluetooth connection between the electronic device and the second earphone when receiving a first confirmation message sent from the first earphone, wherein the first confirmation message indicates that the first earphone has received the first instruction;
   receiving the signal strength between the second earphone and the first earphone sent from the first earphone.

4. The method of claim 1, further comprising:
   connecting to the second earphone via Bluetooth when the signal strength between the second earphone and the first earphone is not greater than the signal strength between the electronic device and the second earphone.

5. The method of claim 1, prior to the operation of determining whether the signal strength between the second earphone and the first earphone is greater than the signal strength between the electronic device and the second earphone, further comprising:
   determining one of the two Bluetooth earphones as the first earphone and the other Bluetooth earphone as the second earphone when the two signal strengths between the electronic device and the two Bluetooth earphones are less than the preset strength, the second earphone corresponding to the signal strength which is less than the other signal strength.

6. The method of claim 1, prior to the operation of determining whether the signal strength between the second earphone and the first earphone is greater than the signal strength between the electronic device and the second earphone, further comprising:
   determining one of the two Bluetooth earphones as the first earphone and the other Bluetooth earphone as the second earphone when one of the two Bluetooth earphones is disconnected with the electronic device, the electronic device keeping the connection with the first earphone and being disconnected with the second earphone.

7. The method of claim 1, prior to the operation of determining whether the signal strength between the second earphone and the first earphone is greater than the signal strength between the electronic device and the second earphone, further comprising:
   keeping the connection between the electronic device and the first earphone and keeping the connection between the electronic device and the second earphone, when the two signal strengths between the electronic device and two Bluetooth earphones are both less than the preset strength.

8. The method of claim 1, after the operation of determining one of the two Bluetooth earphones as a first earphone and the other Bluetooth earphone as a second earphone when one of the two signal strengths is less than or equal to a preset strength, further comprising:
   disconnecting the Bluetooth connection between the electronic device and the second Bluetooth earphone.

9. The method of claim 8, the operation of controlling the first earphone and the second earphone connecting with each other via Bluetooth comprising:
   sending a second instruction to the second earphone, wherein the second instruction is configured to control the second earphone to connect to the first Bluetooth earphone via Bluetooth.

10. The method of claim 9, after the operation of sending a second instruction to the second earphone, further comprising:
    disconnecting the Bluetooth connection between the electronic device and the second earphone when receiving a second confirmation message sent from the second earphone, wherein the second confirmation message indicates that the second earphone has received the second instruction.

11. The method of claim 9, after the operation of sending a second instruction to the second earphone, further comprising:
    sending a third instruction to the first earphone when the electronic device does not receive a second confirmation message from the second earphone within a preset time period, wherein the third instruction is configured to control the first earphone to connect with the second earphone via Bluetooth.

12. The method of claim 8, the operation of controlling the first earphone and the second earphone connecting with each other via Bluetooth comprising:
    sending a third instruction to the first earphone, wherein the third instruction is configured to control the first earphone to connect with the second earphone via Bluetooth.

13. The method of claim 1, after the operation of controlling the first earphone and the second earphone connecting with each other via Bluetooth comprising:

determining whether the signal strength between the electronic device and the second earphone is greater than the preset strength;

controlling the Bluetooth connection between the first earphone and the second earphone to disconnect, and establishing the connection between the electronic device and the second earphone via Bluetooth, when the signal strength between the electronic device and the second earphone is greater than the preset strength.

14. The method of claim 1, further comprising:

keeping the connection between the electronic device and the first earphone and keeping the connection between the electronic device and the second earphone, when the two signal strengths between the electronic device and the two Bluetooth earphones are both greater than the preset strength.

15. An electronic device, comprising:

one or more processors;

a memory; and one or more computer programs, wherein the one or more computer programs are stored in the memory and configured to be executed by the one or more processors, and the one or more computer programs are configured to execute a Bluetooth earphone connecting method, the method comprising:

obtaining two signal strengths between the electronic device and two Bluetooth earphones when the electronic device simultaneously connecting with the two Bluetooth earphones via Bluetooth;

determining one of the two Bluetooth earphones as a first earphone and the other Bluetooth earphone as a second earphone when one of the two signal strengths is less than or equal to a preset strength, the second earphone corresponding to the signal strength which is less than or equal to the preset strength, and the first earphone corresponding to the other signal strength which is greater than the preset strength;

determining whether the signal strength between the second earphone and the first earphone is greater than the signal strength between the electronic device and the second earphone; and keeping the connection between the electronic device and the first earphone, and controlling the first earphone and the second earphone connecting with each other via Bluetooth, when the signal strength between the second earphone and the first earphone is greater than the signal strength between the electronic device and the second earphone.

16. The electronic device of claim 15, prior to the operation of determining whether the signal strength between the second earphone and the first earphone is greater than the signal strength between the electronic device and the second earphone, the method further comprising:

determining one of the two Bluetooth earphones as a first earphone and the other Bluetooth earphone as a second earphone when the two signal strengths between the electronic device and the two Bluetooth earphones are less than the preset strength, the second earphone corresponding to the signal strength which is less than the other signal strength.

17. The electronic device of claim 15, prior to the operation of determining whether the signal strength between the second earphone and the first earphone is greater than the signal strength between the electronic device and the second earphone, the method further comprising:

determining one of the two Bluetooth earphones as the first earphone and the other Bluetooth earphone as the second earphone when one of the two Bluetooth earphones is disconnected with the electronic device, the first earphone remaining the connection with the electronic device.

18. The electronic device of claim 15, wherein the method further comprises:

connecting to the second earphone via Bluetooth when the signal strength between the second earphone and the first earphone is not greater than the signal strength between the electronic device and the second earphone.

19. The electronic device of claim 15, wherein, prior to the operation of determining whether the signal strength between the second earphone and the first earphone is greater than the signal strength between the electronic device and the second earphone, the method further comprises:

keeping the connection between the electronic device and the first earphone and keeping the connection between the electronic device and the second earphone, when the two signal strengths between the electronic device and two Bluetooth earphones are both less than the preset strength.

20. A non-transitory computer readable storage medium, wherein the non-transitory computer readable storage medium stores program codes, the program codes being executable by a processor to perform to execute a Bluetooth earphone connecting method, the method comprising:

obtaining two signal strengths between an electronic device and two Bluetooth earphones when the electronic device simultaneously connecting with the two Bluetooth earphones via Bluetooth;

determining one of the two Bluetooth earphones as a first earphone and the other Bluetooth earphone as a second earphone when one of the two signal strengths is less than or equal to a preset strength, the second earphone corresponding to the signal strength which is less than or equal to the preset strength, and the first earphone corresponding to the other signal strength which is greater than the preset strength;

determining whether the signal strength between the second earphone and the first earphone is greater than the signal strength between the electronic device and the second earphone; and keeping the connection between the electronic device and the first earphone, and controlling the first earphone and the second earphone connecting with each other via Bluetooth, when the signal strength between the second earphone and the first earphone is greater than the signal strength between the electronic device and the second earphone.

* * * * *